(12) United States Patent
Zhang

(10) Patent No.: US 12,497,118 B2
(45) Date of Patent: Dec. 16, 2025

(54) BELL HAVING A MOUNTABLE POSITIONER FOR A BICYCLE

(71) Applicant: Shen zhen shi zhong chuang xun da ke ji you xian gong si, Shenzhen (CN)

(72) Inventor: Yuanhui Zhang, Huizhou (CN)

(73) Assignee: Shen zhen shi zhong chuang xun da ke ji you xian gong si, Shen zhen (CN)

( * ) Notice: Subject to any disclaimer, the term of this patent is extended or adjusted under 35 U.S.C. 154(b) by 535 days.

(21) Appl. No.: 18/056,360

(22) Filed: Nov. 17, 2022

(65) Prior Publication Data

US 2024/0166288 A1 May 23, 2024

(51) Int. Cl.
*B62J 3/04* (2020.01)
*B62H 5/20* (2006.01)
*B62J 45/41* (2020.01)
*B62J 45/42* (2020.01)

(52) U.S. Cl.
CPC ............................... *B62J 3/04* (2020.02); *B62H 5/20* (2013.01); *B62J 45/41* (2020.02); *B62J 45/42* (2020.02)

(58) Field of Classification Search
CPC ... B62J 3/04; B62J 45/41; B62J 45/42; B62H 5/20
See application file for complete search history.

(56) References Cited

U.S. PATENT DOCUMENTS 9,016,911 B2 * 4/2015 Kurumatani ............... B62J 6/03
362/474
11,932,338 B2 * 3/2024 Tsai ............................ B62J 3/12
12,258,089 B2 * 3/2025 Tsai ......................... B62J 45/41
2023/0182849 A1 * 6/2023 Young ..................... B62H 5/20
224/412

OTHER PUBLICATIONS

Rockbros Hidden AirTag Bike Bell | rockbrosbike.us | https://rockbrosbike.us/products/rockbros-hidden-airtag-bike-bell-anti-theft-gps-tracker-for-0-87-22-2mm-1-25-4mm-1-25-31-8mm-handlebars?srsltid=AfmBOoqQaPA_od0BMGKSkk22u7WGWOAbkutu363q4128Y_UkALwJP5B8 [retrieved from internet Jun. 11, 2025]. (Year: 2025).*
CN-219904590-U; Cai, "Locatable Bell for Non-motor Vehicle E.g. Bicycle, Has Locating Seat Provided With Detachable Cover, Mounting Cavity Arranged Between Cover and Locating Seat, and Locating Device Arranged in Mounting Cavity", 2023. (Year: 2023).*
CN-219651324-U; Cai, "Lost-proof Vehicle Bell" 2023. (Year: 2023).*

(Continued)

*Primary Examiner* — Kristina M Deherrera
*Assistant Examiner* — Tania Courson
(74) *Attorney, Agent, or Firm* — Nicholas Makridakis

(57) ABSTRACT

A bell having mountable positioner for bicycle is provided, including a fixing element configured to secure to a handlebar of the bicycle, a sound element configured to generating a bell sound, a sound trigger configured to knock the sound element, and a chamber configured to accommodate and protect the mountable positioner. The sound element and the sound trigger are assembled together to form the chamber. A waterproof rubber ring is arranged on a sound trigger member and is located in the chamber for accommodating and protecting the mountable positioner therein. A space of the chamber is configured to accommodate the mountable positioners of different sizes.

3 Claims, 4 Drawing Sheets

(56) References Cited

OTHER PUBLICATIONS

CN-220315169-U; Mo et al., "A Bell-type Auxiliary Locating Anti-loss Device", 2024. (Year: 2024).*
CN-218751149-U; Shen et al., "Locating Vehicle Bell Convenient for Finding Vehicle", 2023. (Year: 2023).*
CN-205931025-U; Wang, "A Multifunctional Bell and Bicycle", 2017. (Year: 2017).*
DE-202023104256-U1; Yiwu Quantu Electronics Co. Ltd., "Bicycle Bell", 2023. (Year: 2023).*
CN-218317046-U; Liu, "Bicycle Bell With GPS Locating Device", 2023. (Year: 2023).*
CN-206826851-U; Ye, "A Multifunctional Intelligent Power-assisted Bicycle", 2018. (Year: 2018).*
DE-102019128007-B4; Redeker et al., "Bicycle Bell Ringing in a Vehicle", 2022. (Year: 2022).*
DE-202022104121-U1; Ruhry et al., "Bell for a Bicycle", 2022. (Year: 2022).*

* cited by examiner

BELL HAVING A MOUNTABLE POSITIONER FOR A BICYCLE

TECHNICAL FIELD

The present application relates to the technical field of bicycle accessories, in particular to a bell having mountable positioner for bicycle.

BACKGROUND

The bell is an indispensable accessory for bicycles, and the existing bells only have the function of sounding as a warning bell when encountering pedestrians or vehicles blocking, so as to avoid collision with pedestrians or vehicles. With the development of science and technology, positioners are used in various fields. The known system components used for locating bicycles are all installed in positions on the bicycle surface that are easy to find. Due to the structure of the bicycle surface is simple and there is not much hidden space. In case of the bicycle is stolen and the thief will remove the positioner system on the bicycle surface, which means that the stolen bicycle will not be found.

SUMMARY

The present disclosure aims to provide a bell having mountable positioner for bicycle, and a chamber disposed within the bell can satisfy the installation of mountable positioners of different sizes, so as to achieve a hidden locating effect and easily help users find their stolen bicycles.

To achieve the above objectives, the present disclosure adopts the following technical solutions. In some embodiments of the present disclosure, a bell having mountable positioner for bicycle is provided, including a fixing element, configured to secure to a handlebar of the bicycle; a sound element, configured to generating a bell sound; a sound trigger, configured to knock the sound element; and a chamber, configured to accommodate and protect the mountable positioner. Herein the fixing element includes a handlebar fixing ring, a handlebar fixing screw, and a fixed protrusion. The fixed protrusion is connected to a beater extension frame, a lower left surface of the beater extension frame is provided with a recess corresponding in size to the fixed protrusion for connection, a lower right surface of the beater extension frame is configured to engage with an elastic frame, and the elastic frame is configured to connect with a beating head that is located at a top side thereon. A waterproof rubber ring is arranged on a sound trigger member and is located in the chamber for accommodating and protecting the mountable positioner.

Preferably, the sound element and the sound trigger are assembled together to form the chamber, and a space of the chamber is configured to accommodate the mountable positioners of different sizes.

Preferably, a circular track groove is disposed on a bottom of a chamber shell, 5 track protrusions are disposed on the sound trigger member, 4 holes with a uniform distance are disposed in grooves between the track protrusions. Furthermore, the 5 track protrusions disposed on the sound trigger member correspond to the circular track groove disposed on the bottom of the chamber shell, the 4 holes disposed in the grooves between the track protrusions on the sound trigger member correspond to the circular track groove disposed on the bottom of the chamber shell, the chamber shell and the sound trigger member are assembled through the engagement of the circular track groove and the track protrusions and are fixed together with 4 screws.

Preferably, the waterproof rubber ring is configured to be pressed and locked within the track protrusions disposed on the sound trigger member, so as to achieve the waterproof function.

Therefore, the present disclosure adopts the above-mentioned structures of the bell having mountable positioner for bicycle, and the chamber formed by the assemblage of the sound element and the sound trigger can better hide and protect the mountable positioner.

The bell having mountable positioner for bicycle of the present disclosure is further described below through the accompanying drawings and embodiments.

BRIEF DESCRIPTION OF THE DRAWINGS

In order to illustrate the embodiments and the technical solutions of the present disclosure more clearly, the following will briefly introduce the accompanying drawings that are used in the description of the embodiments. Obviously, the drawings in the following description are only some embodiments of the present disclosure. For one of ordinary skill in the art, other drawings can also be obtained according to these drawings without creative effort.

Referring to FIG. 1, illustrating a sound element 1, a sound trigger 2, a fixing element 3, which are the basic structures of the appearance of the bell having mountable positioner for bicycle of the present disclosure.

Referring to FIG. 2, illustrating a knocking shell 101, a set screw 102, a height adjustment member 103, a chamber shell 104, a mountable positioner 401, a strike device 201, a beater U-shaped interface 210, an elastic frame 202, a fixing screw 203, a waterproof rubber ring 204, a sound trigger member 205, a screw 206, a beater extension frame 207, a handlebar fixing ring 301, a handlebar fixing screw 302, and a fixed protrusion 303.

Referring to FIG. 3 and FIG. 4, illustrating the height adjustment member 103, a circular protrusion 105, a circular track groove 106, a chamber 107, a beating head 208, a sound trigger pressing plate 209, a track protrusion 211, a hole 212, a mounting position 4, and the mountable positioner 401.

DETAILED DESCRIPTION OF THE EMBODIMENTS

The bell having mountable positioner for bicycle of the present disclosure will be further described below through specific embodiments and accompanying drawings.

Figure 1:
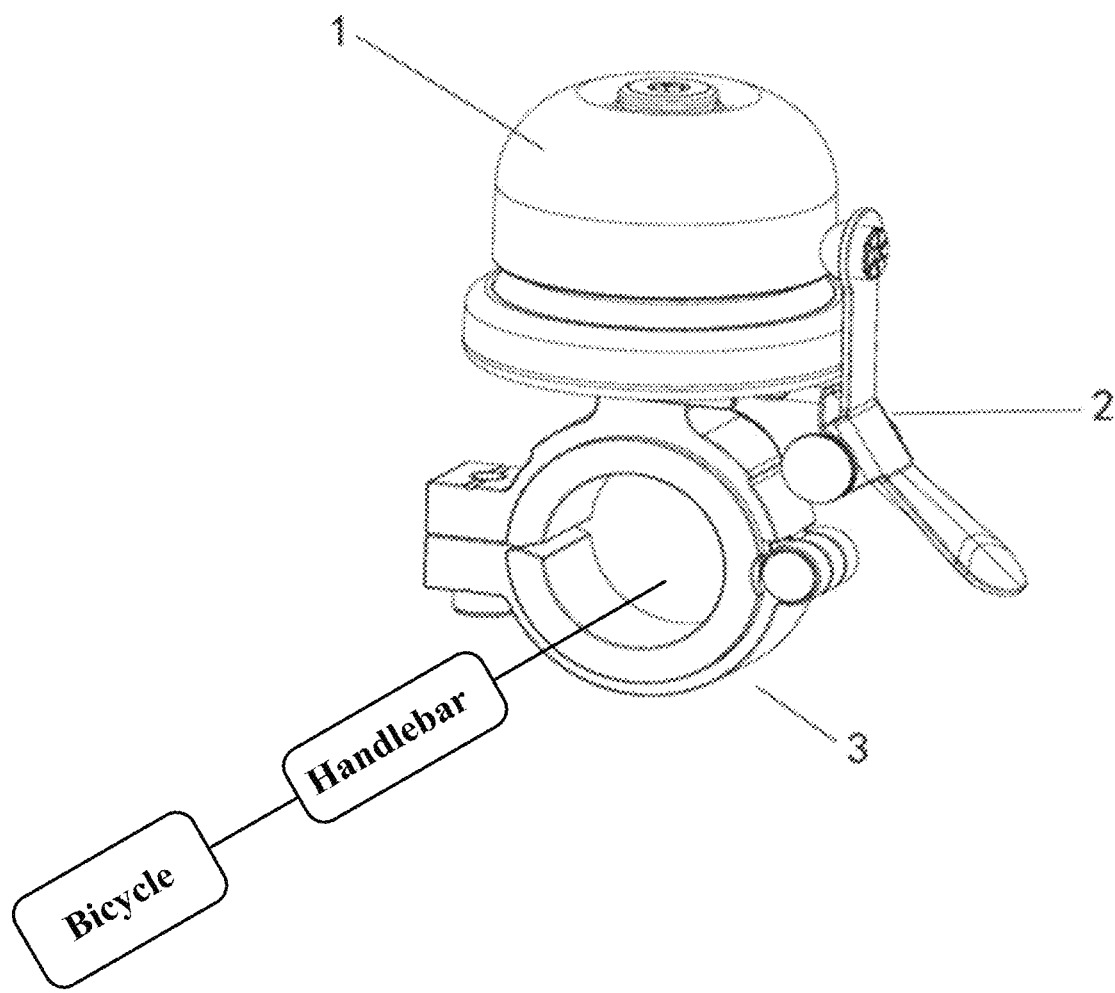
FIG. 1 shows a structural schematic diagram of a bell having mountable positioner for bicycle in an assembled state in accordance with some embodiments of the present disclosure.
Figure 2:
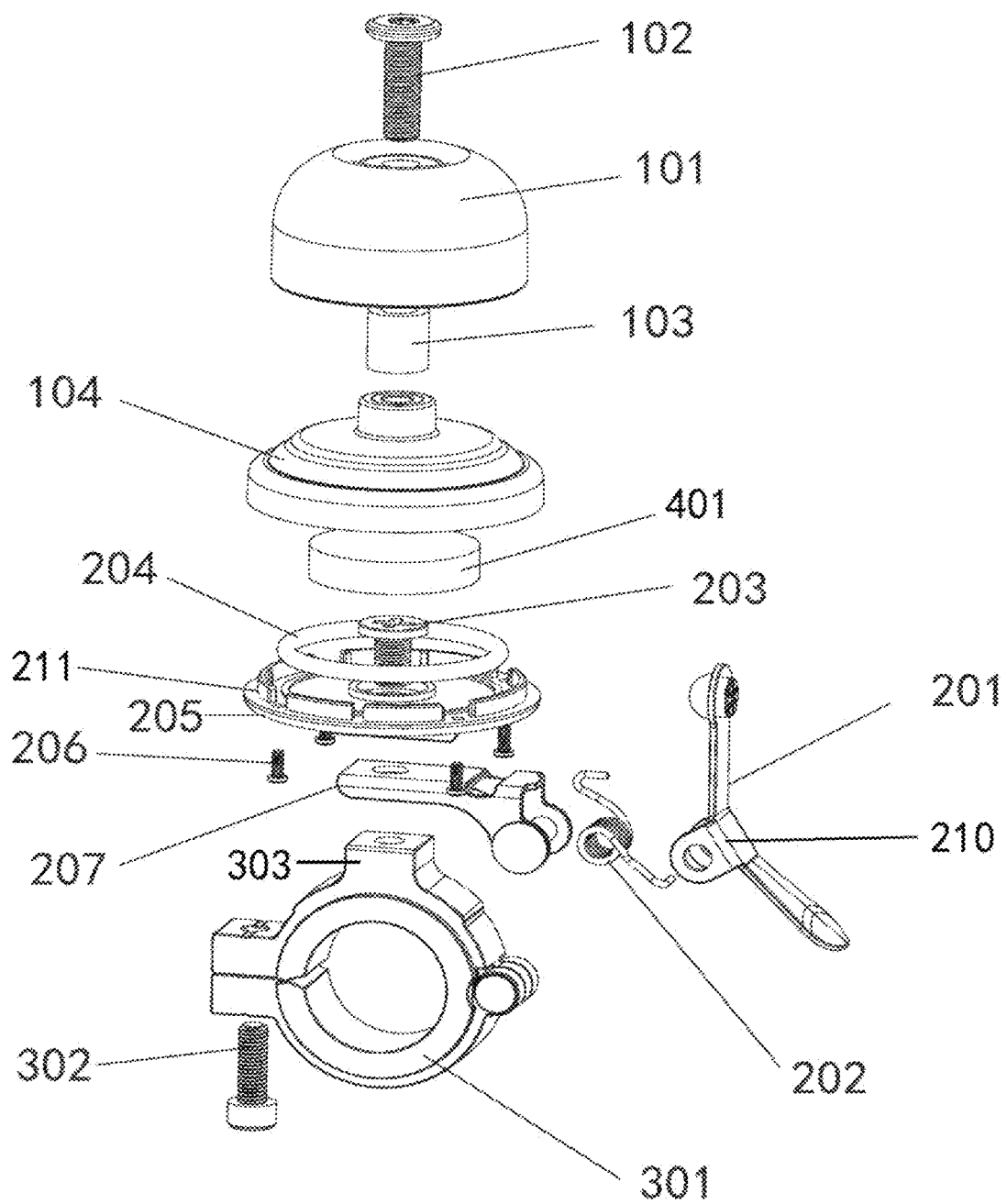
FIG. 2 shows an exploded view of the bell having mountable positioner for bicycle in accordance with some embodiments of the present disclosure.
Figure 3:
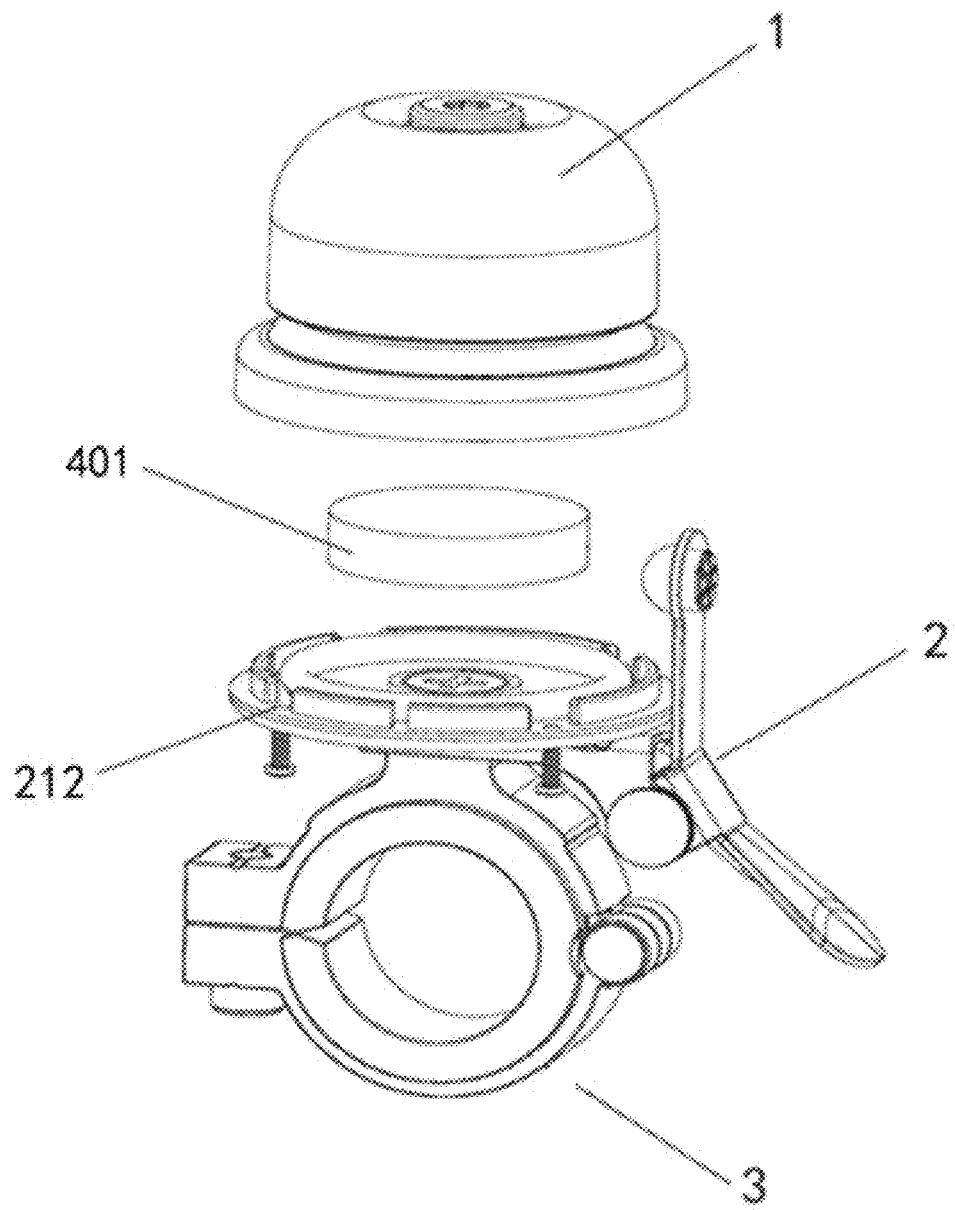
FIG. 3 shows a structural schematic diagram of a chamber in an open state of the bell having mountable positioner for bicycle in accordance with some embodiments of the present disclosure.
Figure 4:
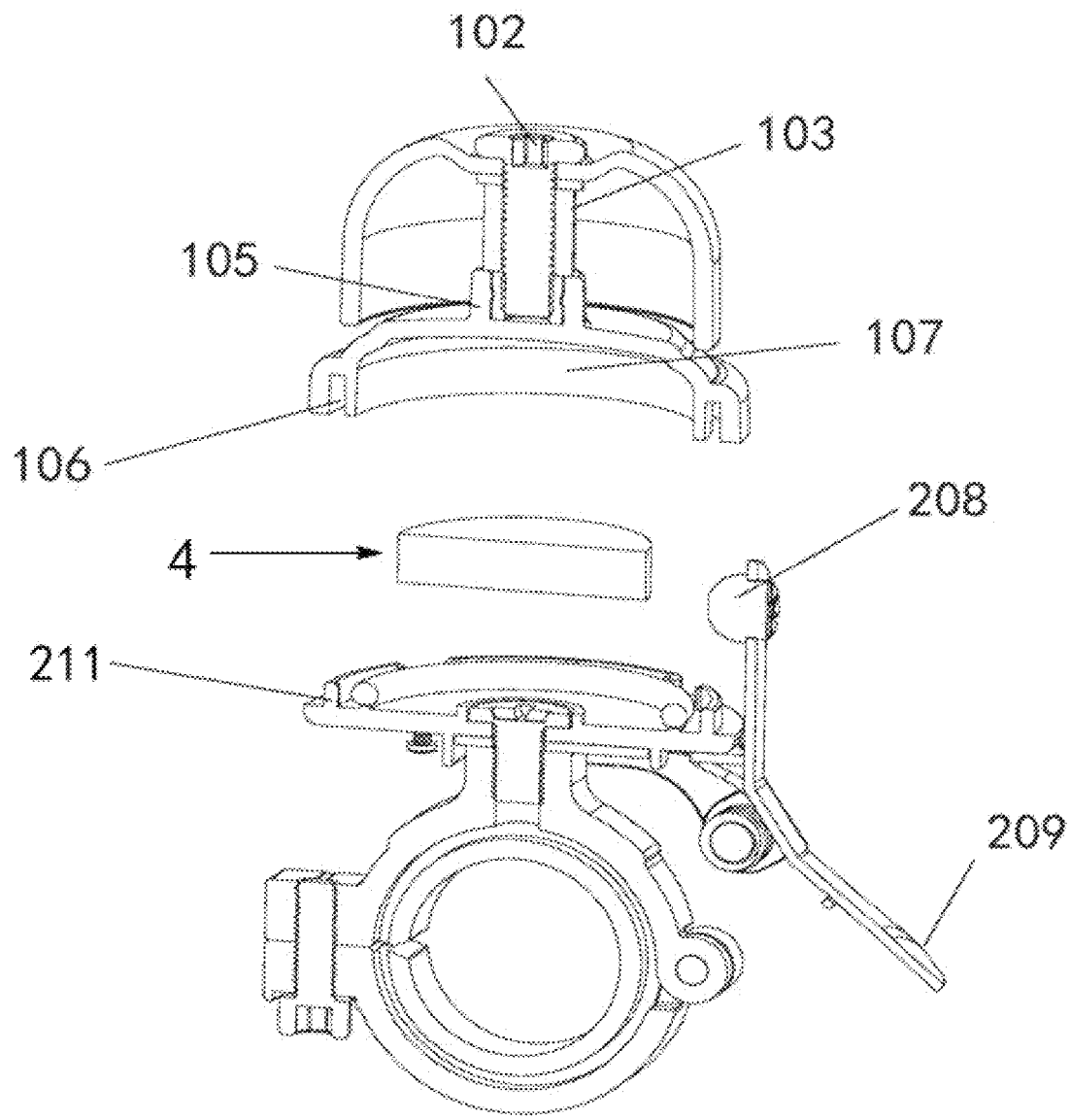
FIG. 4 shows a sectional view of the chamber in the open state f the bell having mountable positioner for bicycle in accordance with some embodiments of the present disclosure.

As shown in FIG. 1 to FIG. 4, in some embodiments of the present disclosure, a bell having mountable positioner for bicycle is provided, includes a sound element 1, a sound trigger 2, and a fixing element 3. A set screw 102 is used to fix the connection between a knocking shell 101 and a chamber shell 104. A fixing screw 203 is used to fix the connection between a sound trigger member 205 and a beater expansion frame 207 on the fixing element 3. 4 screws 206 are used to fix the connection between the sound trigger member 205 and the chamber shell 104. A handlebar fixing screw 302 is used to secure the bell to a handlebar of the bicycle through a handlebar fixing ring 301.

Specifically, as the bell having mountable positioner for bicycle of the present disclosure, the sound element 1 and the sound trigger 2 are assembled to form a chamber 107, and a space of the chamber 107 is configured to accommodate the mountable positioner 401 of different sizes, thereby better hiding the mountable positioner 401.

Specifically, as the bell having mountable positioner for bicycle of the present disclosure, a waterproof rubber ring 204 is arranged on the sound trigger member 205 and is located in the chamber 107 for accommodating and protecting the mountable positioner 401 disposed in the chamber 107.

Specifically, as the bell having mountable positioner for bicycle of the present disclosure, a circular track groove 106 is disposed on a bottom of the chamber shell 104, 5 track protrusions 211 are disposed on the sound trigger member 205, and 4 holes 212 with even distances are disposed in grooves between the track protrusions 211. Moreover, the 5 track protrusions 211 disposed on the sound trigger member 205 correspond to the circular track groove 106 disposed on the bottom of the chamber shell 104, and diameters of the 4 holes 212 disposed in the grooves between the track protrusions 211 on the sound trigger member 205 correspond to a diameter of the circular track groove 106 disposed on the bottom of the chamber shell 104. Furthermore, the chamber shell 104 and the sound trigger member 205 are assembled through the engagement of the circular track groove 106 and the track protrusions 211 and are fixed with 4 screws 206.

Specifically, as the bell having mountable positioner for bicycle of the present disclosure, when the battery of the mountable positioner 401 is insufficient, the chamber 107 can be opened by removing the 4 screws 206, so as to take out the mountable positioner 401, and then replace the battery or recharge the mountable positioner 401.

Specifically, as the bell having mountable positioner for bicycle of the present disclosure, a height adjusting member 103 is connected with a circular protrusion 105, and the height adjusting member 103 is configured to be stretched to adjust its length, the circular protrusion 105 has a built-in threaded hole for inserting the set screw 102. In this way, the height adjustment member 103 is fixed between the knocking shell 101 and the circular protrusion 105 through the set screw 102, and the height adjustment member 103 is arranged vertically along a center of the chamber 107.

Specifically, as the bell having mountable positioner for bicycle of the present disclosure, an elastic frame 202 is formed by bending elastic metal wires, has a Z-shaped structure, and is divided into an upper fixed section, a lower fixed section and a middle connecting section. The upper fixed section of the elastic frame 202 is hooked with a square groove disposed on a right side of a beater extension frame 207, the middle connecting section of the elastic frame 202 is embedded in a lower groove disposed on the right side of the beater extension frame 207, and the lower fixed section of the elastic frame 202 is connected with a sound trigger pressing plate 209.

Specifically, as the bell having mountable positioner for bicycle of the present disclosure, the fixing element 3 includes a handlebar fixing ring 301, a handlebar fixing screw 302, and a fixed protrusion 303. The handlebar fixing ring 301 is provided with an opening and a rotating final shaft, the handlebar of the bicycle passes through the opening and is fixed with the handlebar fixing ring 301 through the handlebar fixing screw 302. When the bell is fixed on the handlebar of the bicycle, the handlebar fixing ring 301 can be easily opened. The fixed protrusion 303 is connected to the beater extension frame 207, a lower surface of the left side of the beater extension frame 207 is provided with a recess corresponding in size to the fixed protrusion 303 for engagement, lower surface of the right side of the beater extension frame 207 is configured to engage with the elastic frame 202, and the elastic frame 202 is configured to connect with a beating head 208 that is located at a top side thereon.

Specifically, as the bell having mountable positioner for bicycle of the present disclosure, when a pedestrian or a vehicle is blocked, the sound trigger pressing plate 209 is pressed, and a beating head 208 hits the sound element 1, thereby emitting a bell sound to alert the pedestrian or the vehicle.

Specifically, as the bell having mountable positioner for bicycle of the present disclosure, the mountable positioner 401 is configured to determine a position of the bicycle and is disposed in the chamber 107, a mounting position 4 is arranged in the chamber 107 and is configured to place the mountable positioner 401, and a passive or active NFC (Near Field Communication) transmitter, a GNSS (Global Navigation Satellite System) transmitter, or a BLUETOOTH wireless transmitter. And, a space of the chamber 107 is configured to accommodate the mountable positioner 401 of different sizes.

What is claimed is:

1. A bell having a mountable positioner for a bicycle, comprising:
    a fixing element, configured to secure to a handlebar of the bicycle,
    a sound element, configured to generating a bell sound,
    a sound trigger, configured to knock the sound element, and
    a chamber, configured to accommodate and protect the mountable positioner;
    wherein
    the fixing element comprises a handlebar fixing ring, a handlebar fixing screw, and a fixed protrusion;
    the fixed protrusion is connected to a beater extension frame, a lower left surface of the beater extension frame is provided with a recess corresponding in size to the fixed protrusion for connection, a lower right surface of the beater extension frame is configured to engage with an elastic frame, and the elastic frame is configured to connect with a beating head that is located at a top side thereon;
    a waterproof rubber ring is arranged on a sound trigger member and is located in the chamber for accommodating and protecting the mountable positioner; and
    the sound element and the sound trigger are assembled together to form the chamber;
    the waterproof rubber ring is configured to be pressed and locked within track protrusions disposed on the sound trigger member;

a circular track groove is disposed on a bottom of a chamber shell; and the sound trigger member is provided with 5 track protrusions, and 4 holes at an even distance are disposed in grooves between the track protrusions.

2. The bell having the mountable positioner for the bicycle according to claim 1, wherein the 5 track protrusions disposed on the sound trigger member correspond to the circular track groove disposed on the bottom of the chamber shell, the 4 holes disposed in the grooves between the track protrusions on the sound trigger member correspond to the circular track groove disposed on the bottom of the chamber shell, the chamber shell and the sound trigger member are assembled through the engagement of the track groove and the track protrusions and are fixed together with 4 screws.

3. The bell having the mountable positioner for the bicycle according to claim 1, wherein the mountable positioner is configured to determine a position of the bicycle and is disposed in the chamber, a mounting position is arranged in the chamber and is configured to place the mountable positioner, and a passive or active NFC transmitter, a GNSS transmitter, or a BLUETOOTH wireless transmitter; and wherein a space of the chamber is configured to accommodate the mountable positioners of different sizes.

* * * * *